United States Patent [19]

Zoebeli

[11] Patent Number: 4,771,759

[45] Date of Patent: Sep. 20, 1988

[54] METHOD FOR SEVERING A ROD IN SLICES, SLICING MACHINE FOR CARRYING OUT THE METHOD AND USE OF THE SLICING MACHINE

[75] Inventor: Armin Zoebeli, Steffisburg, Switzerland

[73] Assignee: Meyer + Burger AG, Steffisburg, Switzerland

[21] Appl. No.: 38,729

[22] Filed: Apr. 15, 1987

[30] Foreign Application Priority Data

Apr. 17, 1986 [EP] European Pat. Off. ........ 86810177.5

[51] Int. Cl.⁴ .............................................. B28D 1/04
[52] U.S. Cl. ................................... 125/13 R; 51/73 R
[58] Field of Search ........................ 51/73 R, 215 UE; 125/13 R; 279/3

[56] References Cited

U.S. PATENT DOCUMENTS

| | | | |
|---|---|---|---|
| 3,577,861 | 5/1971 | Bender | 51/73 R |
| 3,833,230 | 9/1974 | Noll | 51/235 |
| 4,116,095 | 9/1978 | Cousino | 51/73 R |
| 4,209,005 | 6/1980 | Tremeau | 51/73 R |

FOREIGN PATENT DOCUMENTS

| | | | |
|---|---|---|---|
| 0079744 | 11/1982 | European Pat. Off. | |
| 2360488 | 8/1977 | France | |
| 1079373 | 3/1984 | U.S.S.R. | 279/3 |

*Primary Examiner*—Frederick R. Schmidt
*Assistant Examiner*—Maurina Rachuba
*Attorney, Agent, or Firm*—Bernard, Rothwell & Brown

[57] ABSTRACT

A slicing machine in which a workpiece rod is disposed without cutting base on a table of the machine and it may be brought by means of a feeding slide step by step into a working position in the range of action of an inner cutting-off wheel. For removing the severed slices of arbitrary thickness, a vacuum chuck with a crown of suction nozzles is connected through a ball joint capable to be locked with a support and a horizontal slide. By shifting the horizontal slide and when the ball joint is loosened, the vacuum chuck may be put against the rod with a definite force and oriented, and then the ball joint is locked so that the vacuum chuck is rigidly maintained in the oriented position. The pressure force of the vacuum chuck may be recleared and the vacuum chuck with its support may be clamped with the vacuum chuck in the released position. This permits a clear, proper slicing of the rod without danger of breaks at the time when the separation takes place.

18 Claims, 6 Drawing Sheets

# METHOD FOR SEVERING A ROD IN SLICES, SLICING MACHINE FOR CARRYING OUT THE METHOD AND USE OF THE SLICING MACHINE

BACKGROUND OF THE INVENTION

The present invention relates to a method for severing a rod in slices and more particularly in disks by means of a slicing machine, in which the slices are taken over and removed by means of a vacuum chuck when the slicing of material is completed. Methods, particularly slicing machines for slicing rods from hard material, e.g. silicon into thin disks (wafers) are known. The slicing machines usually have an inside diameter (i.d.) annular saw blade in which an abraisive coated thickened inner edge of an annular, rotating slicing saw blade slices the rod. Particular problems arise with respect to the removing of the wafers of hard, relatively brittle material sliced from the rod. If at the time of slicing of the rod, too strong residual forces are exerted on the sliced wafer, there exists a danger of a broken edge on the wafer or on the rod immediately before the completion of the separation of the wafer from the rod. Such breaks are not acceptable so a cutting base of soft material is molded or glued along a line on the surface of the rod at the location at which the wafer leaves the rod after each slicing operation. The cutting base still has to be cut through in order for the wafer produced to be removed. Finally, each wafer must be freed from the cutting base which adheres to it (EP-A-0 079 744). Such a procedure consumes too much material and time and therefore is not attractive. It is further known from FR-A-2 360 488 to proceed without a cutting base and to seize each disk by means of a resilient, conical membrane shortly before the completion of the cutting-off operation. In such case, the membrane is sucked by vacuum. However, a safe control of the force acting on the membrane under suction is not possible.

SUMMARY OF THE INVENTION

It is an object of the present invention to create a method and a slicing machine which permits perfect slicing of wafers from rods from hard, brittle material without the above mentioned drawbacks. To solve this problem, the method according to the invention is characterized in that at each cut, a vacuum chuck which is capable of being oriented and positioned with respect to its support is pressed against the front face of the rod and adheres to the latter by suction so that it is positioned and oriented to rest uniformly on the front face before the slicing is completed, whereupon the pressure of the vacuum chuck is removed, and in that after completion of the slicing, the vacuum chuck with the wafer is removed from the rod and the wafer is separated from the vacuum chuck. The slicing machine according to the present invention is characterized by a workpiece holder for the rods, a vacuum chuck for holding wafers which is capable of being positioned and oriented against the rod and by means for controlling the pressure force on the vacuum chuck.

The pressure force against the rod, the positioning and the orienting of the vacuum chuck may take place before the beginning of the slicing operation or up to about half the cutting depth in order to maintain a precise orientation of the vacuum chuck without any deformation of the already cut part of the disk.

A precise orientation of the vacuum chuck on the free front face of the rod must be obtained at the time of the first cut or as a consequence of a modification of the orientation of the rod after which the orientation of the free front face is no longer accurately parallel to the cutting plane. Due to the accurate positioning and orienting of the vacuum chuck which adheres by suction to the free front face of the rod and due to the following release, the vacuum chuck adheres without forces to the rod, particularly to the severed wafer after completion of the slicing operation so that there exists no danger of breaks even if one operates without cutting base. It is thus possible to operate in any case without the usual, soft cutting base which must also be cut through but, if necessary, it may be replaced by a thin sheet which prevents a direct contact between the rod and its support and also assists in preventing breaks of material at the end of the slicing operation. The vacuum chuck may comprise a crown of individual, preferably rigid suction nozzles for providing an optimal alignment of the vacuum chuck to the free front face of the rod. In another form of execution, it is possible to provide only three suction nozzles for ensuring a uniform, statically determined support of all nozzles.

Preferably, the vacuum chuck is coupled to its support by means of a ball joint and this joint may be locked as desired in a predetermined position or left free. In the latter case, the vacuum chuck with the freely mobile ball joint is put against the front face of the rod and oriented and then, the joint is locked in order to bind rigidly the vacuum chuck to its support.

The pressure of the vacuum chuck against the front face of the rod for positioning and orienting it with respect to the front face takes place preferably through pressure means such that after removing of the pressure therof, the vacuum chuck adheres practically without forces to the front face of the rod, particularly to the wafer produced by the slicing operation. The orientation of the vacuum chuck on the front face of the rod is provided by vacuum which permits the vacuum chuck to adhere by suction before the pressure from the pressure means is removed.

In order to guarantee a rigid, fixed relative position of the rod and the removing device, the slicing machine is preferably of such design that the workpiece holder and the vacuum chuck are arranged in a rigid, fixed relative position on a common frame of the machine while the saw, e.g. an i.d. saw blade, executes the cutting feed for slicing. In the known slicing machines, the i.d. saw blade is supported on a fixed part of the machine while the workpiece holder executes the feed movement during the slicing operation. Such a relative movement of the workpiece holder with respect to the vacuum chuck could lead to undesirable relative movement between the workpiece and the vacuum chuck which in turn could generate tensions and breaking of the rod at the end of the slicing operation. The slicing machine of this invention having a fixed workpiece holder during the slicing operation and a fixed wafer removal device for the sliced wafers is of independent significance. The invention relates also more particularly to a use of the slicing machine which is characterized in that an orientable or a fixed vacuum chuck is pressed against the rod, particularly against a workpiece to be removed by means of a resilient displacing device such that the positioning takes place by itself, independently of the thickness of the wafer to be sliced-off. The resilient positioning of the vacuum chuck against the workpiece is preferably achieved by pressure means and it permits` within determined limits a proper positioning of the vacuum chuck with adequate pressure, independently of the precise position of the free front face of the workpiece, particularly independently of the thickness of the wafer to be cut-off. This permits production of wafers of optimal thickness due to the fact that the vacuum chuck places itself into the required position for removing the wafer after completion of the slicing operation.

DETAILED DESCRIPTION OF THE PREFERRED EMBODIMENTS

Figure 2:
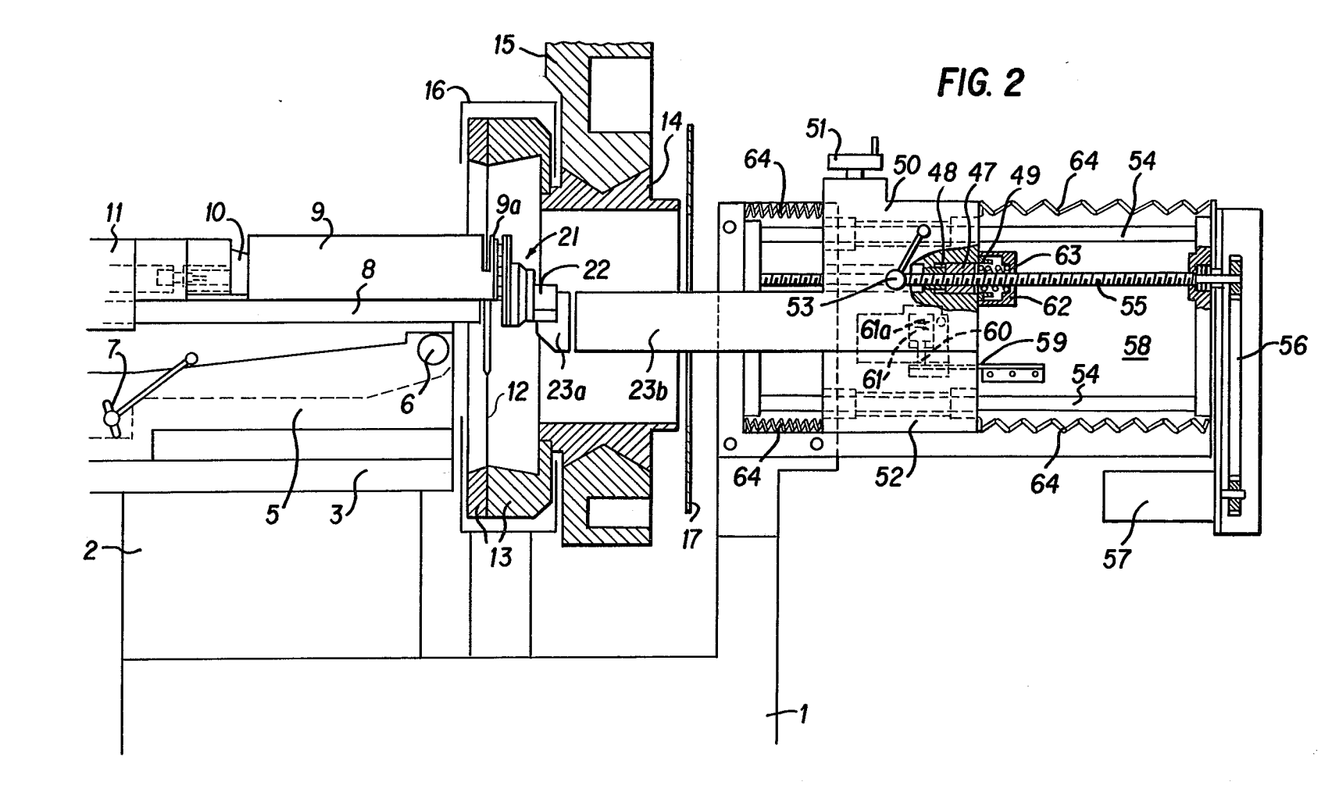
FIG. 2 shows a side view partially in section of the slicing machine.

According to FIG. 2, the slicing machine comprises a rigid support 1. A swinging support 2 locked to the support 1 may be swung about an axis 4 after loosening of a nut illustrated device in order to allow for good access to the i.d. saw blade. A receiving support 5 is slewably arranged on a supporting plate 3 rigidly coupled to the swinging support 2. The receiving support serves for orientating the workpiece in the horizontal direction about an axis not shown and it may be clamped in the desired position by means not shown. A table 8 orientable about a horizontal axis 6 in the receiving support 5 is capable to be locked by means of a clamping lever 7. On the table 8 lies directly, that is without cutting base, the workpiece 9, e.g. a silicon rod. If desired, a sheet may be glued to the workpiece 9 in order to avoid any damage to the workpiece when the latter is displaced on the table 8 and also to avoid small breaks of certain materials when the i.d. saw blade 12 comes out of the workpiece. The sheet may have a thickness of e.g. 0.1 to 1 mm. The workpiece 9 is connected to an adapter 10 which is removably screwed to a feeding slide 11 by means of which the workpiece may be presented step by step on the table 8 in order to sever individual parts, more particularly disks or wafers, from the rod-shaped workpiece 9. The above described device, except for the direct support of the workpiece on the table 8 of the workpiece receiving device, corresponds to the usual execution of such known slicing machines.

The i.d. saw blade 12 is stretched in a ring 13 schematically represented in two parts, which ring is part of a rotor 14. This rotor is rotatably supported in a sweep 15, e.g. by means of an aerostatic bearing and the rotor is driven by means of a motor not represented. The configuration of the rotor and of the annular i.d. saw blade 12 is known for such machines and they do not deserve further explanations. Parts of the housing, particularly protecting devices 16 and 17 are schematically illustrated in the drawing.

Figure 1:
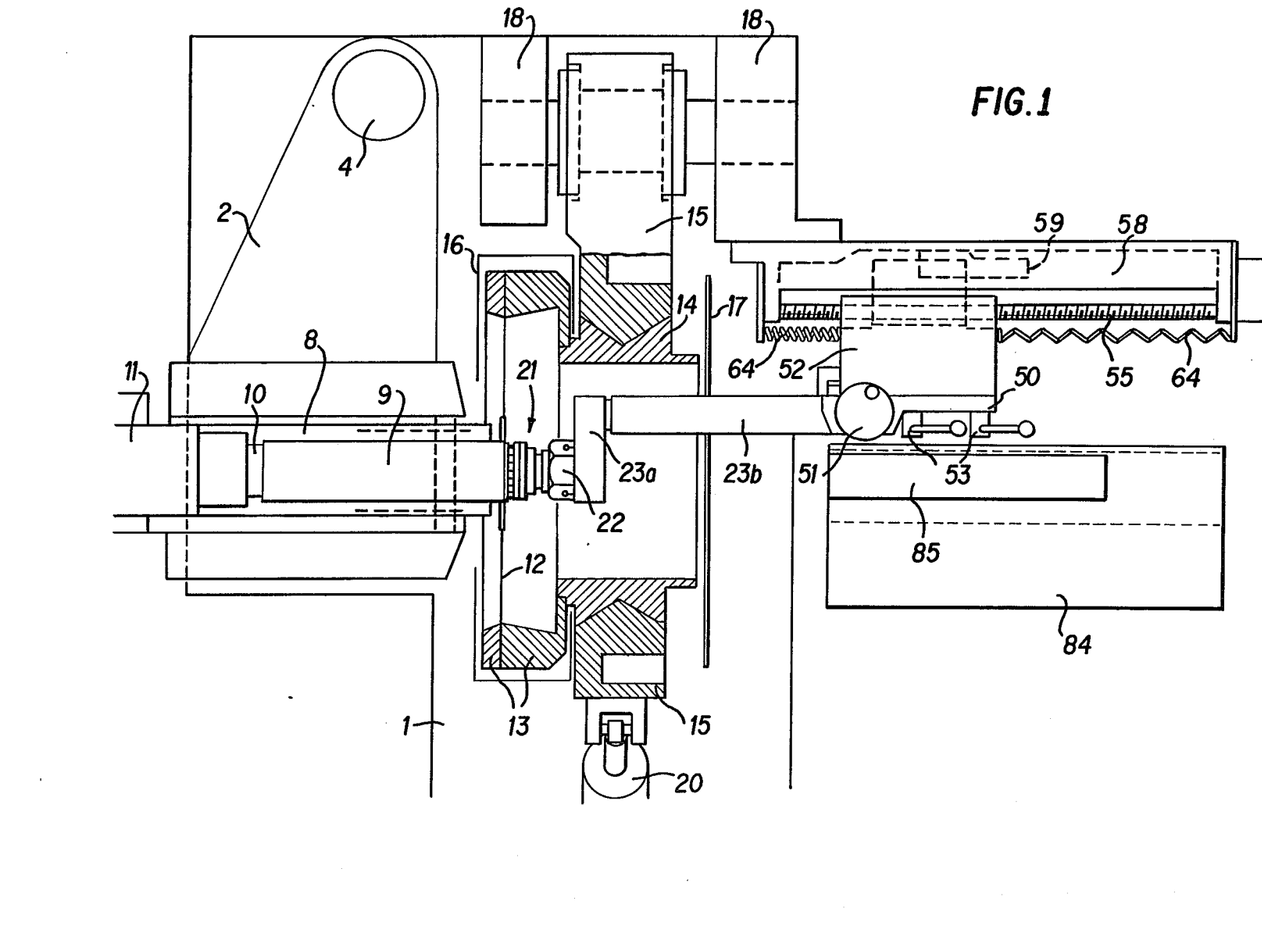
FIG. 1 shows a top view partially in section of the slicing machine.
Figure 3:
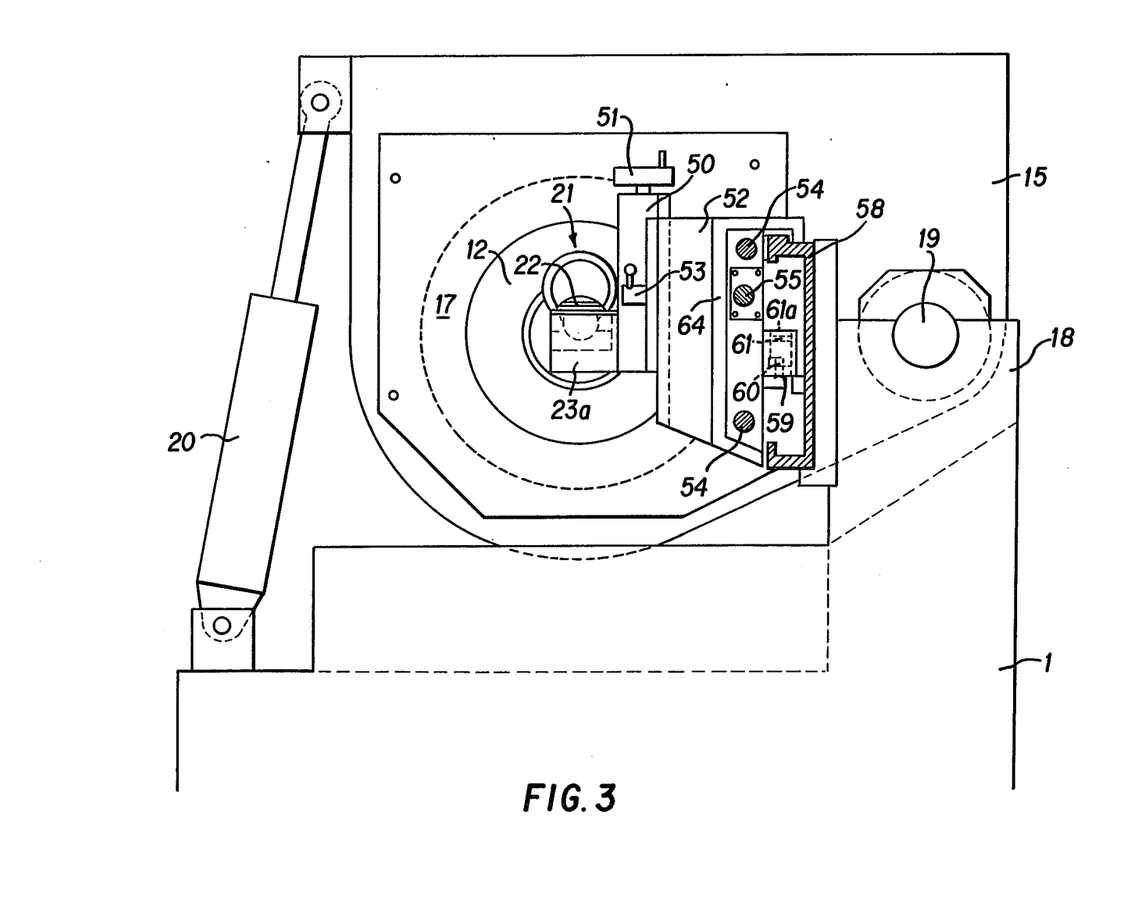
FIG. 3 shows a front view partially in section of the removing side of the slicing machine.

As more particularly shown in FIGS. 1 and 3, the sweep 15 is pivotably supported about an axis 19 in bearing blocks 18 of the support of the machine and it can be swung about the axis 19 by means of a hydraulic cylinder 20. The slicing movement, particularly the slicing feed is therefore determined by the swing of the sweep and thus by the lowering of the i.d. saw blade 12 on the workpiece 9. As mentioned, this arrangement has the particular advantage that the above described workpiece holder as well as the cut wafer removing device (to be described later on) must not execute any relative movement during the slicing operation so that their relative position is fixedly determined by the direct rigid connection through the common machine support 1. The removing device comprises a vacuum chuck 21 which is removably secured to a supporting arm 23 by means of a connecting part 22, which supporting arm comprises a front part 23a connected to the vacuum chuck 21, said front part being slewably arranged with respect to a rear part 23b as will be described later on in more detail. However, normally, the arm parts 23a and 23b are rigidly coupled together in a predetermined position and they positively determine the position of the vacuum chuck 21.

Figure 4:
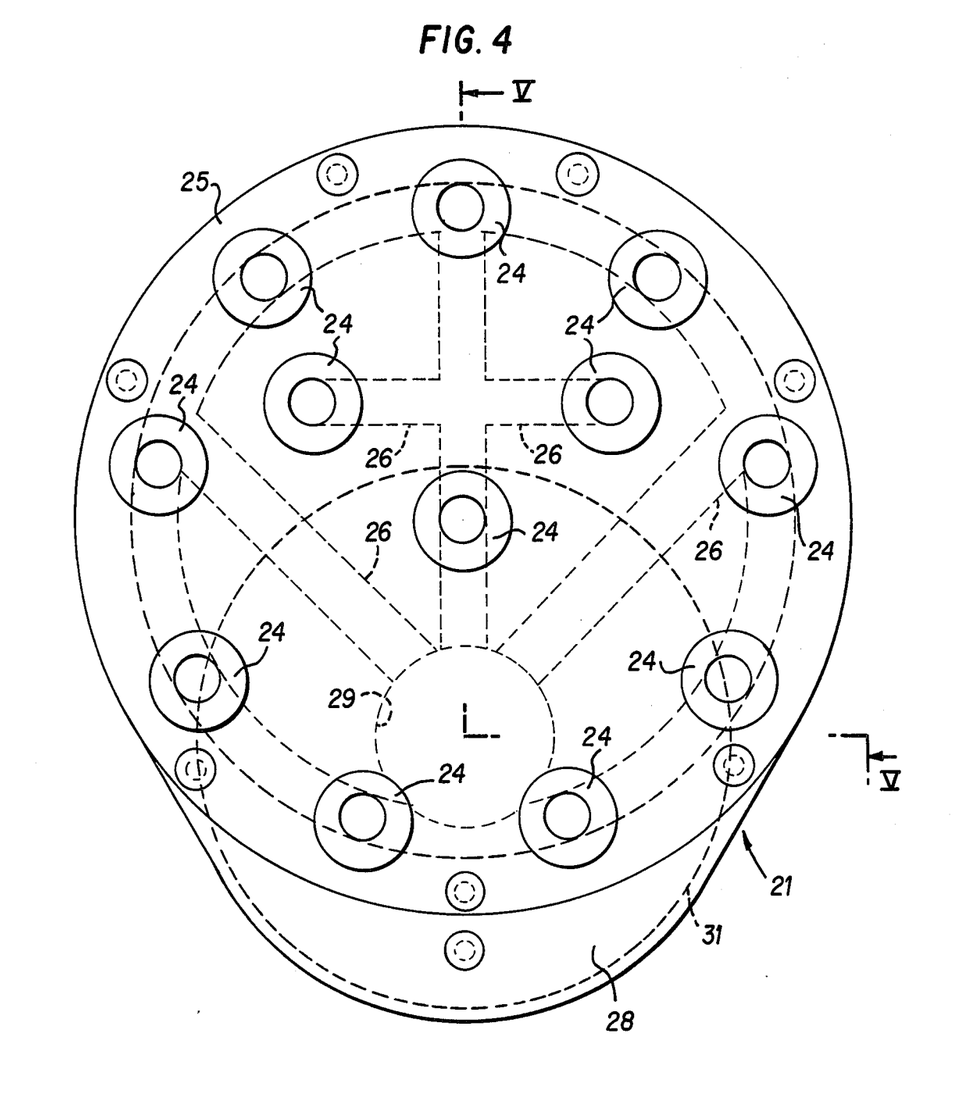
FIG. 4 shows a front view of the vacuum chuck.
Figure 5:
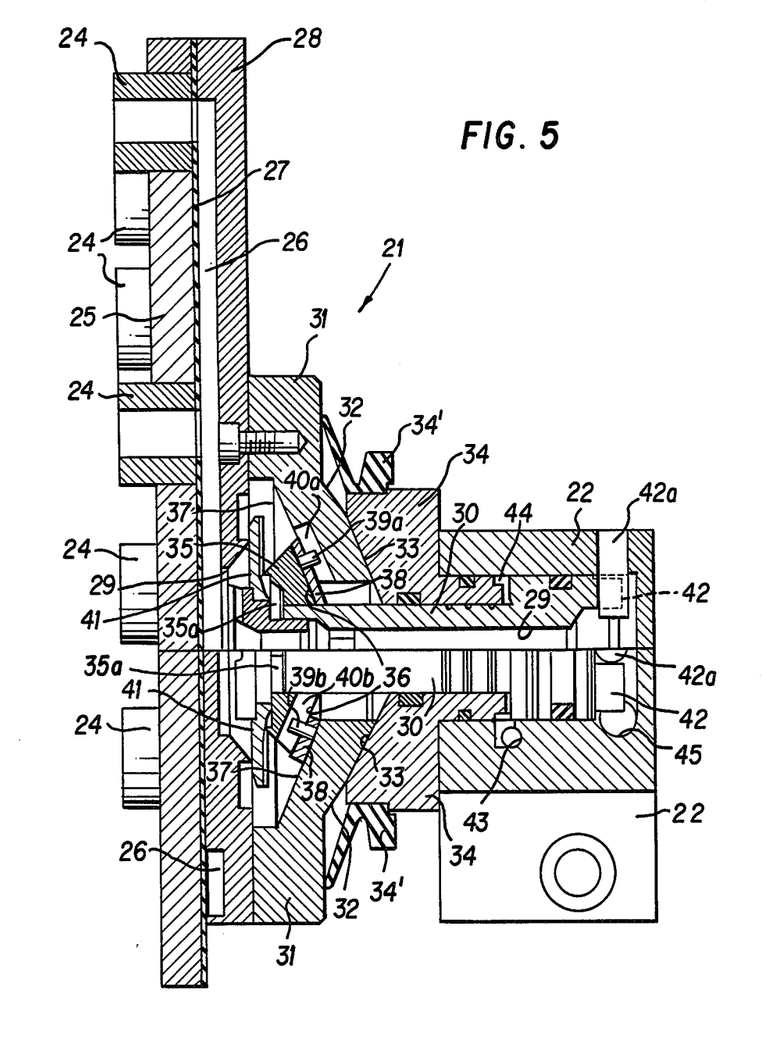
FIG. 5 shows a section through the vacuum chuck along the line V—V of FIG. 4.

The construction of the vacuum chuck 21 and of its connecting part 22 is illustarted in the FIGS. 4 and 5. The vacuum chuck comprises a circular crown of suction nozzles 24 which are inserted in a circular plate 25. They comprise outer, cantilever precisely machined front faces which are appropriate for positioning, particularly for attaching to the freely accessed opposite front face of the rod 9 as shown in FIGS. 1 and 2.

The holes of the suction nozzles 24 are in connection with the vacuum channels 26 milled in the plate 28, these channels being made tight by means of a sealing plate 27 lying between the plate 25 and a plate 28. All vacuum channels 26 are directly or indirectly in connection with the axial holes 29 of a sleeve shaped clamping piston 30. The plate 28 is rigidly screwed to a mounting plate 31 with a spherical supporting surface 32 which lies against a conical supporting surface 33 of a housing element 34. The latter is tight fitting and fixedly connected to the connecting part 22. On the clamping piston 30 is secured a clamping ring 35 having a spherical clamping surface 36. Between this clamping ring 35 and a conical surface 37 of the mounting plate 31 there is inserted a spherical, folded, flat coupling member 38 which in one plane (FIG. 5 at the top) engages with studs 39a in grooves 40a of the mounting plate 31 while in the other plane (FIG. 5, bottom) it engages with corresponding studs 39b in grooves 40b of the clamping ring 35. This provides cardanic torsional coupling between the clamping ring 35 and the mounting plate 31. The clamping ring 35 is held in a determined orientation on the clamping piston 30 by means of inserted feather keys 35a and the opposite end of the clamping piston 30 is secured against rotation by means of a groove 42 and a pin 42a of the connecting part 22. A medium under pressure may be introduced through an inlet 43 in a chamber 44 between the housing element 34 and the thickened end acting as a piston of the clamping piston 30, in order to exert a force directed to the right in FIG. 5. Vacuum in channel 29 may be produced through a further inlet 45 and through the channels 26 in the suction nozzles 24. An elastomeric packing 41 is inserted between the clamping ring 35 and the plate 28, this packing preventing a loss of vacuum. A soft seal 34' is arranged between the mounting plate 31 and the housing element 34.

The mounting plate 31 and the housing element 34 form with their spherical and conical surfaces 32 and 33 a ball joint between the fixedly mounted parts 22 and 34 and the vacuum chuck 21. In the illustrated condition, where the pressure chamber 44 is without pressure and the clamping piston 30 is in its rest position full to the left, no pressure force act between the parts 31 and 34 so that the vacuum chuck 21 may be swung while surmounting only a small resistance. If it is then pressed against the front side of the rod 9, the outer faces of suction nozzles 24 lie snugly fitting against the front face of the rod 9 and the vacuum chuck 21 is accurately oriented according to the front face. The pressure of the lower suction nozzles 24 is higher than the pressure of the upper suction nozzles because, as desired, the pressure force underneath the center of the crown of suction nozzles is applied when the pressure of the vacuum chuck takes place for the first time, when as shown in FIG. 2 a certain depth of the cut is already attained. Reference to these operations in relation to each other is made later on. By connecting of the vacuum and adherence of the vacuum chuck, a snugly fitting and an accurate orientation of the vacuum chuck to the front face of the rod 9 is obtained.

The arm 23 which supports the suction basket is secured to a vertical slide 50. This vertical slide may be adjusted vertically to a horizontal slide 52 by means of a clamping lever 53. The horizontal slide may be displaced horizontally on rods 54. The horizontal displacement takes place by means of a spindle 55 which is driven in both directions by a toothed belt 56 and a motor 57. To a guide rail 58 arranged at the side of the guides 54, particularly of the horizontal slide 52, in the direction of displacement of the horizontal slide 52, is arranged a steel strap 59 with which the piston rod 60 of a clamping cylinder 61 cooperates for locking the horizontal slide in a predetermined working position.

A nut 47 which cooperates with the spindle 55 is in form of a piston in a cylinder bore. In the annular chamber 48 between the inner annular cylinder wall is introduced a medium under pressure which displaces the horizontal slide 52 with respect to the spindle nut 47 to the left in FIG. 2, thus permitting the vacuum chuck 21 to be pressed with a predetermined force, but resiliently and flexibly against the front face of the rod 9. If the spindle nut 47 is displaced to the right in FIG. 2, the horizontal slide 52 is taken along to the right with the parts connected to it through a limit ring 49, a coil spring 62 and a sleeve 63 connected to the horizontal slide. In this way, a resilient connection acts in both directions which permits a certain overstepping of the spindle nut, 47 over a limit position.

The guide rods 54 and the displaceable guides supported by them as well as the mechanism of the horizontal slide are protected by the guide bed 58 and bellows 64.

Figure 6:
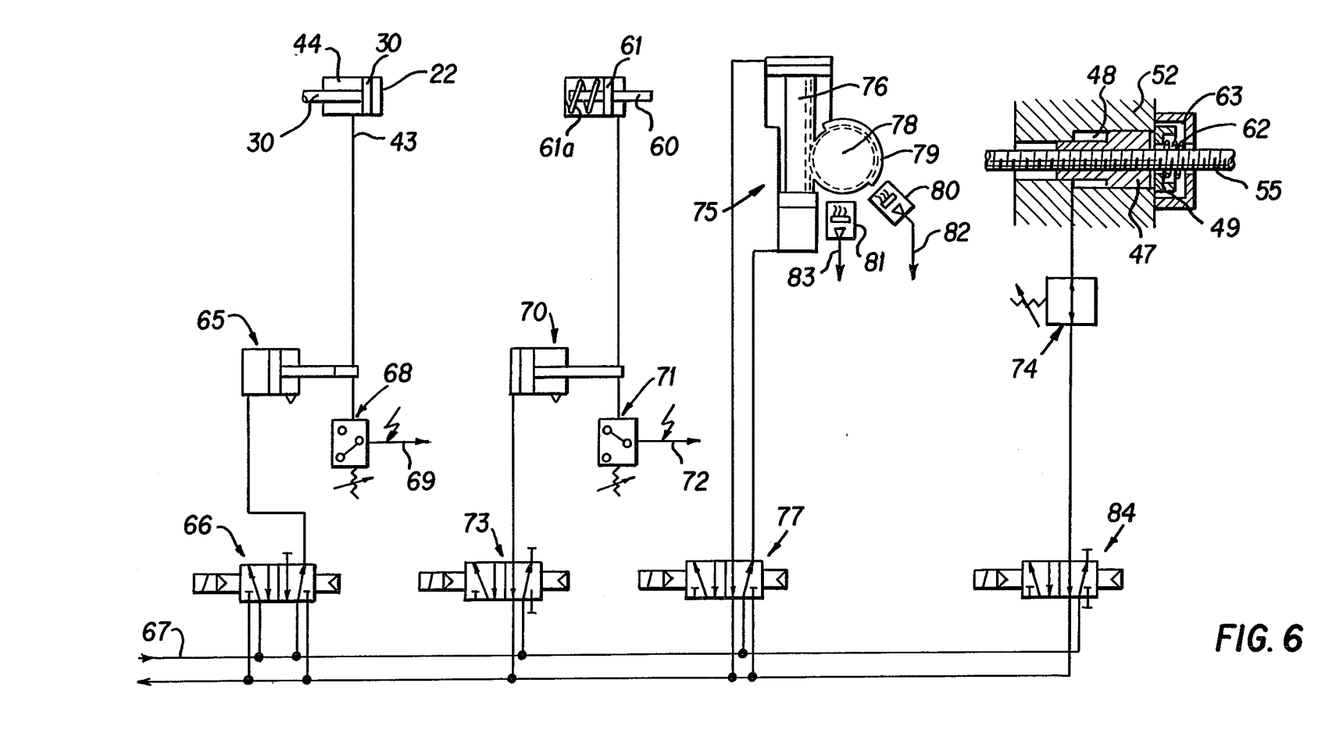
FIG. 6 shows a pneumatic schematic diagram illustrating the controls and operation of the machine.

FIG. 6 shows a hydropneumatic diagram in which corresponding elements are designated by the same reference numbers as in the other Figures, these elements of the machine being illustrated schematically. The inlet 43 may be fed by a pressure medium from an amplifier of medium under pressure 65. This amplifier of medium under pressure may receive in turn the medium under pressure from a feeding pipe 67 through a reversing valve 66 or it may be disconnected from the medium under pressure. If the pressure at the high pressure side, that is at the inlet 43 reaches the working pressure, a pressure switch 68 is actuated and it delivers a signal of actuation on a line 69. The clamping cylinder 61 may also be fed through a pressure amplifier 70 to which, also at the high pressure side, is connected a pressure switch 71 which delivers a signal on line 72 when the working pressure is present, or absent. The control takes place through a reversing valve 73. The supply of the medium under pressure to the cylinder chamber 48 takes place by means of an adjustable pressure regulator and a reversing valve 84. Further, there is provided a reversible pneumatic cylinder 75 which selectively permits a rack 76 to move to one or another end position. The rack 76 meshes with a gear wheel 78 which is coupled to the arm supporting the mobile part 23a of the vacuum chuck 21. By actuating of the cylinder 75 in one or the other direction, the arm 23 with the vacuum chuck 21 may be swung from a working position to an ineffective position, in order to create place for another removal device 84 which may serve e.g., to remove larger workpieces such as workpiece 85. Detectors 80 and 81 cooperate with a control segment 79 of the gear wheel 78 for transmitting on lines 82, 83 information relating to the position of the part 23a, and the vacuum chuck 21.

The operation of the illustrated slicing machine is as follows:

FIGS. 1, 2 and 6 show the condition during the slicing operation. As shown in FIG. 2, about half of the i.d. saw blade 12 has penetrated in the rod 9. The vacuum chuck 21 adheres by suction to the front side of the rod 9, and particularly to an already partially severed wafer 9a. The pressure chamber 44 is under pressure through the valve 66 and the pressure amplifier 65 so that the clamping piston 30 in FIG. 5 is urged to the right. Therefore, the plate 31 with its spherical surface 32 is urged by the pressure ring 35 against the conical surface 33 of the housing element 34 so that the vacuum chuck 21 is rigidly connected in the predetermined position with the connecting part 22 and the arm 23. According to FIG. 6, the pressure chamber 48 is without pressure and because the spindle nut 47 is guided freely, without any sealing element, in the horizontal slide 52, this slide and the parts connected to it are fully relieved. In this manner, the vacuum chuck 21 exerts no force or only a very small i.e., substantially negligible force on the rod 9, particularly the wafer 9a. The cylinder 61 is without pressure so that the clamping piston 60 is urged against the lug 59 by the spring 61a which locks in its position the horizontal slide 52 and the parts connected to it. Afterwards, the spindle nut 47 is shifted to the right in FIG. 2 by switching on of the motor for a short time in order to compress the spring 62.

The removal device remains in this position until the wafer 9a is completely separated from the rod 9. At the instant of the separation, practically no force acts on the separated wafer 9a and no relative displacement takes place between this wafer, the vacuum chuck and the rod 9 because these components are in mutual rigid connection over the support 1 of the machine, the cutting feed of the i.d. saw blade 12 being given by swinging of the sweep 15. In this way, a proper cut with flat cutting surfaces takes place at the rod 9 as well as at the wafer 9a.

After completion of the slicing operation of the wafer 9a from the rod 9, the latter may be withdrawn by means of the slide 11; also the wafer 9a is withdrawn when the valve 73 is reversed and then the pressure amplifier 70 and consequently also the cylinder 60 are set under pressure. The clamping piston 60 is lifted by the lug 59 and it liberates the horizontal slide 52 for the withdrawal of the same. Due to the prestressed compression spring 62, the slide 52 and hence the vacuum chuck with the disk 9a is slightly withdrawn. Whereupon, the sweep 15 with the cutting-off wheel is withdrawn to the start position, whereby the i.d. saw blade 12 is completely lifted up outside of the region of the rod 9. At the same time the horizontal slide 52 with the arm 23, the vacuum chuck 21 and the previously separated wafer 9a are displaced by the drive of the spindle 55 to the right in FIGS. 1 and 2 until a position determined by a stop switch, not represented. The position of the horizontal slide 52 is determined by a mechanical stop and a possible surpassing of this position by the spindle, particularly the spindle nut 47, is rendered possible by the spring 62 which is compressed by the spindle when surpassing. Then, the wafer 9a is taken over in a known manner not represented and then the vacuum in the vacuum chuck is released so that the wafer may be removed. As the case may arise, a swing of the part 23a with the vacuum chuck 21 to a receiving position by means of the cylinder 75 may take place, however, this swing is preferably provided for the above mentioned objective, namely to create place for another removal device.

After the wafer 9a has been removed, the spindle 55 is driven in the reverse direction in order to bring back the horizontal slide 52 again in the working position illustrated in FIGS. 1 and 2. At the same time or before, the rod 9 is shifted of a partial step to the right in FIG. 2 by means of the feeding slide 11 so that the free front face of the rod 9 lies in the most frontal plane of the rod, particularly the disk to be cut shown in FIG. 2. In this way, later on, a new disk of arbitrary thickness may be severed. During the advance of the horizontal slide 52 to the left in FIGS. 1 and 2, pressure is admitted in the pressure chamber 48 by reversing the valve 84 in order for the spindle nut 47 to carry along to a certain extent the horizontal slide 52 by the pressure spring in the chamber 48. When the vacuum chuck 21 with its suction nozzles 24 reaches and touches the free front face of the rod 9 being fed, the pressure in the pressure chamber 48 determines the pressure force of the vacuum chuck 21 against the front face of the rod 9. During the advance of the horizontal slide 52 in the illustrated working position, the valve 66 is already reversed so that the pressure amplifier 65 and the pressure chamber 44 become pressure free. The clamping piston 30 liberates the pressure ring 35 so that the force of the plate 31 against the housing part 34 is suppressed and the vacuum chuck 21 becomes capable of free motion. When the suction nozzles of the vacuum chuck hit the free front face of the rod 9, the vacuum chuck becomes oriented exactly parallel to the front face, provided it is not already parallelly oriented. The pressure force of the vacuum chuck 21 against the rod 9 is determined in this case by the pressure in the pressure chamber 48 and a possible surpassing of the spindle nut 47 beyond a determined stop position of the horizontal slide 52 remains without importance because the pressure chamber 48 acts so to speak as a pneumatic spring which permits this surpassing without influencing the pressure force of the vacuum chuck.

After completion of the orientation, the vacuum chuck 21 is evacuated in order to compel it to adhere by suction to the front face of the rod 9. Then, the valve 66 is again reversed so that as indicated, the ball joint between the vacuum chuck 21 and its support becomes locked by the pressure force of the plate 31 against the housing part 34. The valve 84 is then reversed and the pressure is drawn off from the chamber 48. In this condition, the locking of the ball joint between the vacuum chuck 21 and the connecting part 22, particularly the arm 23 may take place just now. Then the horizontal slide 52 is locked by reversing the valve 73 again in its working position. In between the slicing operation has already begun or it starts now. In this way, the illustrated starting position is reached. It has been so far described that the ball joint between the vacuum chuck 21 and its support is loosened and readjusted during each cycle. However, this operation is only required when a change of the orientation of the rod 9 takes place, that is when the free rod extremity is no longer parallel to the plane of the i.d. saw blade 12. By the described construction of the drive of the horizontal slide 52 with its locking device, there is guaranteed an automatic positioning of the vacuum chuck 21 in accordance each time to the thickness of the wafer 9a, even without the mentioned ball joint in the vacuum chuck 21, that is wafers of different thicknesses may be obtained without any modification of the adjustments at the removal system.

In accordance with the sort of the additional construction of the connecting part 22 which supports the vacuum chuck 21, there exists the possibility to eliminate the ball joint 22, e.g. utilize a vacuum chuck without the ball joint.

I claim:

1. A method of slicing a rod into wafers of constant or variable thickness by a slicing machine having a vacuum chuck for holding sliced wafers, the method comprising:
    (a) displacing the vacuum chuck axially until the vacuum chuck contacts the end of the rod from which the wafers are severed by applying a displacing pressure force to the vacuum chuck;
    (b) orienting the vacuum chuck by allowing the vacuum chuck freedom of movement so that is may be oriented and aligned with the face of the vacuum chuck uniformly contacting the end of the rod from which wafers are to be cut;
    (c) applying vacuum to the vacuum chuck before the completion of a slicing cut;
    (d) relieving the displacing pressure force on the vacuum chuck before completion of a slicing cut by the slicing machine;
    (e) withdrawing the vacuum chuck from the rod at the completion of the slicing cut so that a sliced wafer is removed from the rod; and
    (f) removing vacuum from the vacuum chuck after completion of the slicing cut so that a cut wafer is removed from the vacuum chuck.

2. A method as in claim 1 further comprising clamping the vacuum chuck after completion of the orienting step.

3. A method as in claim 1 wherein the relieving of displacing pressure force on the vacuum chuck is accomplished by removal of pressure to a cylinder.

4. A method as in claim 3 further comprising clamping the axial displacement position of the vacuum chuck after release of the displacing pressure force on the vacuum chuck.

5. A slicing machine for severing a rod into wafers comprising:
    (a) a machine support base;
    (b) a workpiece holder for a rod to be sliced, the workpiece holder movably mounted on the machine base;
    (c) a vacuum chuck having a face for contacting and removing wafers severed from the rod;

(d) vacuum chuck mounting means mounted on the machine base allowing the vacuum chuck to move freely axially of the rod workpiece to allow orientation of a vacuum chuck face with an outer face of a wafer to be severed from the rod;

(e) means for applying vacuum to the vacuum chuck;

(f) power displacement means for moving the vacuum chuck mounting means to move the vacuum chuck face axially against the outer face of the wafer to be severed from the rod with a positive pressure force;

(g) an internal diameter saw movably mounted from the machine base and driven to cut wafers from the end of the rod;

(h) control means for releasing the positive pressure force of the vacuum chuck against the wafer applied by the power displacement means before the saw completes a cut, and for releasing the vacuum to the vacuum chuck after the saw completes a cut.

6. A slicing machine as in claim 5 wherein the vacuum chuck mounting means includes an axially movable vacuum chuck support and a ball joint between a face of vacuum chuck and the vacuum chuck support.

7. A slicing machine as in claim 6 further comprising means for locking the ball joint in any position.

8. A slicing machine as in claim 7 further comprising a cardonic safety joint between the vacuum chuck and the vacuum chuck support.

9. A slicing machine as in claim 5 wherein the power displacement means is a pressure cylinder.

10. A slicing machine as in claim 9 wherein the pressure cylinder includes means allowing the vacuum chuck support to move with little friction.

11. A slicing machine as in claim 9 wherein the pressure cylinder comprises a piston and a piston rod which carries a nut, and a spring positioned to return the piston and release pressure of the vacuum chuck against the wafer.

12. A slicing machine as in claim 5 further comprising means for mutually rigidly positioning the workpiece holder and the vacuum chuck to the machine support base when the saw slices a wafer.

13. A slicing machine as defined in claim 5 further comprising means for feeding the vacuum chuck axially to the rod and swinging radially of the rod to accommodate at least one further wafer removal system.

14. A slicing machine as in claim 5 further comprising means positioning the face of the vacuum chuck eccentrically to the side of rod that the saw blade enters.

15. A slicing machine as in claim 5 wherein the power displacement means is resilient such that displacement of the vacuum chuck is independent of the thickness of a wafer cut from the rod.

16. A slicing machine as defined in claim 5 wherein the vacuum chuck face contains a plurality of suction nozzles.

17. A slicing machine as defined in claim 16 wherein the suction nozzles have precisely machined front faces.

18. A slicing machine as defined in claim 5 wherein the vacuum chuck mounting means allows horizontal displacement of the vacuum chuck, and the workpiece holder mounts the rod to be sliced on a horizontal axis.

* * * * *